United States Patent [19]
Garthwaite et al.

[11] Patent Number: 6,124,826
[45] Date of Patent: *Sep. 26, 2000

[54] NAVIGATION DEVICE FOR PEOPLE

[75] Inventors: Paul Garthwaite, Baldham; Gerd Waizmann, Riedering, both of Germany

[73] Assignee: Mannesmann Aktiengesellschaft, Düsseldorf, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/817,307

[22] PCT Filed: Oct. 6, 1995

[86] PCT No.: PCT/DE95/01415

§ 371 Date: Apr. 7, 1997

§ 102(e) Date: Apr. 7, 1997

[87] PCT Pub. No.: WO96/11381

PCT Pub. Date: Apr. 18, 1996

[30] Foreign Application Priority Data

Oct. 7, 1994 [DE] Germany ............... 44 36 999
Jun. 6, 1995 [DE] Germany ............... 195 21 929

[51] Int. Cl.[7] .................................................. G01S 3/02
[52] U.S. Cl. ................... 342/357.09; 342/357.13; 340/995
[58] Field of Search .............................. 342/357, 357.06, 342/357.08, 357.09, 357.1, 457; 701/213, 215, 211, 36; 455/346; 348/552, 837, 118; 340/995, 990; 353/12

[56] References Cited

U.S. PATENT DOCUMENTS

| | | | |
|---|---|---|---|
| 4,819,174 | 4/1989 | Furuno et al. ................... 340/995 |
| 4,954,959 | 9/1990 | Moroto et al. .................. 340/995 |
| 5,289,378 | 2/1994 | Miller et al. ................ 364/424.04 |
| 5,522,089 | 5/1996 | Kikinis et al. .................. 395/893 |
| 5,543,789 | 8/1996 | Behr et al. ..................... 340/995 |
| 5,625,668 | 4/1997 | Loomis et al. ................... 342/357 |
| 5,712,899 | 1/1998 | Pace, II ........................... 342/357 |
| 5,745,865 | 4/1998 | Rostoker et al. ................. 701/117 |
| 5,794,164 | 8/1998 | Beckert et al. ..................... 701/36 |
| 5,859,628 | 1/1999 | Ross et al. ........................ 345/173 |

FOREIGN PATENT DOCUMENTS

| | | |
|---|---|---|
| 34 45 668 | 1/1986 | Germany . |
| 35 27 240 | 2/1987 | Germany . |
| 41 39 581 | 6/1993 | Germany . |
| 43 00 927 | 7/1994 | Germany . |

OTHER PUBLICATIONS

Heti et al, "Travelguide: Ontario's Route Guidance System", IEE Vehicle Navigation & Information Systems Conf, Ottawa–VNIS, 1993.

Marchent, "Concepts for Vehicle Route Guidance", Second Int'l Conf. on Road Traffic Monitoring, 1989, p. 176–181.

*Primary Examiner*—Gregory C. Issing
*Attorney, Agent, or Firm*—Cohen, Pontani, Lieberman & Pavane

[57] ABSTRACT

A navigation device for people, which device includes a navigation unit, which has a receiver device for the wireless transmission of data to identify the current geographic position, a communication unit that contains an input unit, especially for the input of a target position, and an output unit, especially for the output of path guidance information, and a computer, especially for route planning, which has a memory with at least one digitized road map and can be connected for data transmission to the navigation unit via the communication unit.

The navigation unit, the communication unit, the input unit and the output unit form a portable hardware unit, which is equipped with its own power supply and with a transmitter/receiver unit. The computer for calculating essential portions of the route plan is disposed in a stationary manner outside of the portable unit and is connected to a transmitter/receiver for the wireless transmission of route information between the computer and the portable unit it.

7 Claims, 2 Drawing Sheets

NAVIGATION DEVICE FOR PEOPLE

BACKGROUND OF THE INVENTION

Field of the Invention

The invention relates to a navigation device for people, such a device includes a navigation unit, which has a receiver device for the wireless transmission of information to identify the current geographic position of the person, a communication unit, which comprises an input unit, especially for the input of a target position, and an output unit, especially for the output of path guiding information, and a computer, especially for route planning. The computer has a memory with at least one digitalized road map and can be connected for data transmission to the navigation unit via the communication unit.

DESCRIPTION OF THE PRIOR ART

From DE 34 45 668, a generic navigation device for a vehicle is known, which has a portable control device. The control device, which is designed as a transportable handheld device, has its own display for the output of route planning tips. The control device also has operating devices, especially for the input of a desired target position. A route computer integrated into the handheld device has access to a stored digital road network map and, starting from a predetermined starting position, determines a route to a predetermined target position. This allows route planning to be carried out even before a trip begins. The route determined by the route computer can be manually adjusted to match the individual driver's wishes, taking into account traffic conditions, insofar as these are known. For the purpose of navigation, the control device in the form of a handheld device is connected via an interface to other devices of the navigation system, particularly to a navigation unit for detecting the current geographical position. Based on the current geographical position of the vehicle as well as on its route, appropriate travel tips are output on the display to guide the vehicle to its target.

In the known generic device, it is disadvantageous that the navigation device is only fully functional in those motor vehicles in which supplementary components (e.g., navigation computer, display devices) that can be connected to the control device are preinstalled; i.e., the navigation device cannot be taken along on trains or other means of public transportation or carried by pedestrians for navigational assistance. Outside of a vehicle, the known navigation device permits only route planning and/or route optimization. Using the known navigation device, it is not possible to switch to another form of transportation without interrupting the navigational assistance.

SUMMARY OF THE INVENTION

The object of the present invention is to provide a convenient and portable navigation device for people, which makes it is possible to switch at any time to other means of transportation, particularly public transportation, trains, rental vehicles and the like, without interrupting the navigational assistance. A further object of the invention is to provide a device that can be used in a geographical area of almost any desired size without requiring extensive geographical information stored on memory media, especially local maps and street directories, to be taken along.

According to the invention, the navigation device for people has a navigation unit, a communication unit and a computer, particularly for route determination. The computer has a memory with at least one digitized road map and can be connected for data transmission to the navigation unit via the communication unit. The navigation unit has a receiver device for the wireless transmission of data to identify the current geographical position. The communication unit has an input unit, particularly for the input of a target position, and an output unit, particularly for the output of routing information. The navigation unit, the communication unit, the input unit and the output unit form a portable hardware unit that has its own power supply and transmitter/receiver. The computer that calculates essential portions of the route plan is disposed in a stationary manner outside of the portable unit and is connected to a transmitter/receiver for the wireless transmission of route information between the computer and the portable unit.

As a result, no powerful computer needs to be carried along. Furthermore, it is not necessary to take along extensive geographical data, local maps, street directories, etc. stored on memory media and covering the entire region for each city or area in which a user stops or stays temporarily. The stationary external computer makes it possible for the navigation device to be almost universally accessible and reduces its weight considerably, so that the device can be embodied in portable fashion. In this context, "stationary" means only that the computer used for route determination need not be carried along by the person using the navigation system. Instead, the computer can be installed at any location desired. The computer exchanges its route information with a large number of portable units according to the invention. Preferably, the wireless transmitter/receiver used for this purpose is a mobile phone.

In respect to determining current geographical position, it is especially advantageous to be able to connect the mobile phone of the wireless transmitter/receiver to a cellular phone network. The current geographical position can then be determined by the computer or by a computer system of the mobile phone network based on the signals from the current geographical position to the individual receiver stations of the mobile phone network. Advantageously, the mobile phone is equipped for this purpose with a device to regularly transmit its identification data. As a result, the existing mobile phone network can also be used for position finding.

The current geographical position can be detected with especially high accuracy when the navigation unit is a radio direction-finding system.

An especially small and lightweight navigation unit can be achieved by embodying the navigation unit as a receiver for a satellite navigation system. in this case, it is advantageous for the receiver of the navigation unit to be oriented to receive correction signals, which can be used to improve the accuracy of the position identification.

Advantageously, the output unit has a display on which the current position can be shown with a map of the surrounding area.

The technical outfitting and weight of the navigation device can be further reduced by outputting the routing tips in a step-by-step manner controllable by the external computer. This means that only a small amount of memory is needed in the portable unit, even for extensive route information, so that an economical memory can be used.

An especially compact and rugged navigation unit is attained when the output unit is also embodied as the input unit. Input, especially of the target position, can in this case be carried out by marking or handwritten input on the display.

It has proved advantageous for the output unit and/or the input unit to be equipped to transmit voice information.

The navigation device can be of simple design, in respect to its electronics system and weight, when the communication unit comprises a microcomputer.

A universally applicable navigation device is obtained when the communication unit has an interface that allows its integration into the electronics system of a motor vehicle.

To output information, the communication unit can advantageously be connected via the interface to a display integrated in the dashboard of a motor vehicle.

In further embodiment of the invention, to ensure that guidance is always based on a current route, the computer is part of a traffic guidance system.

BRIEF DESCRIPTION OF THE DRAWING

The invention is described in greater detail below in reference to the navigation device for people shown in the drawing.

DETAILED DESCRIPTION OF THE PREFERRED EMBODIMENTS

Figure 1:
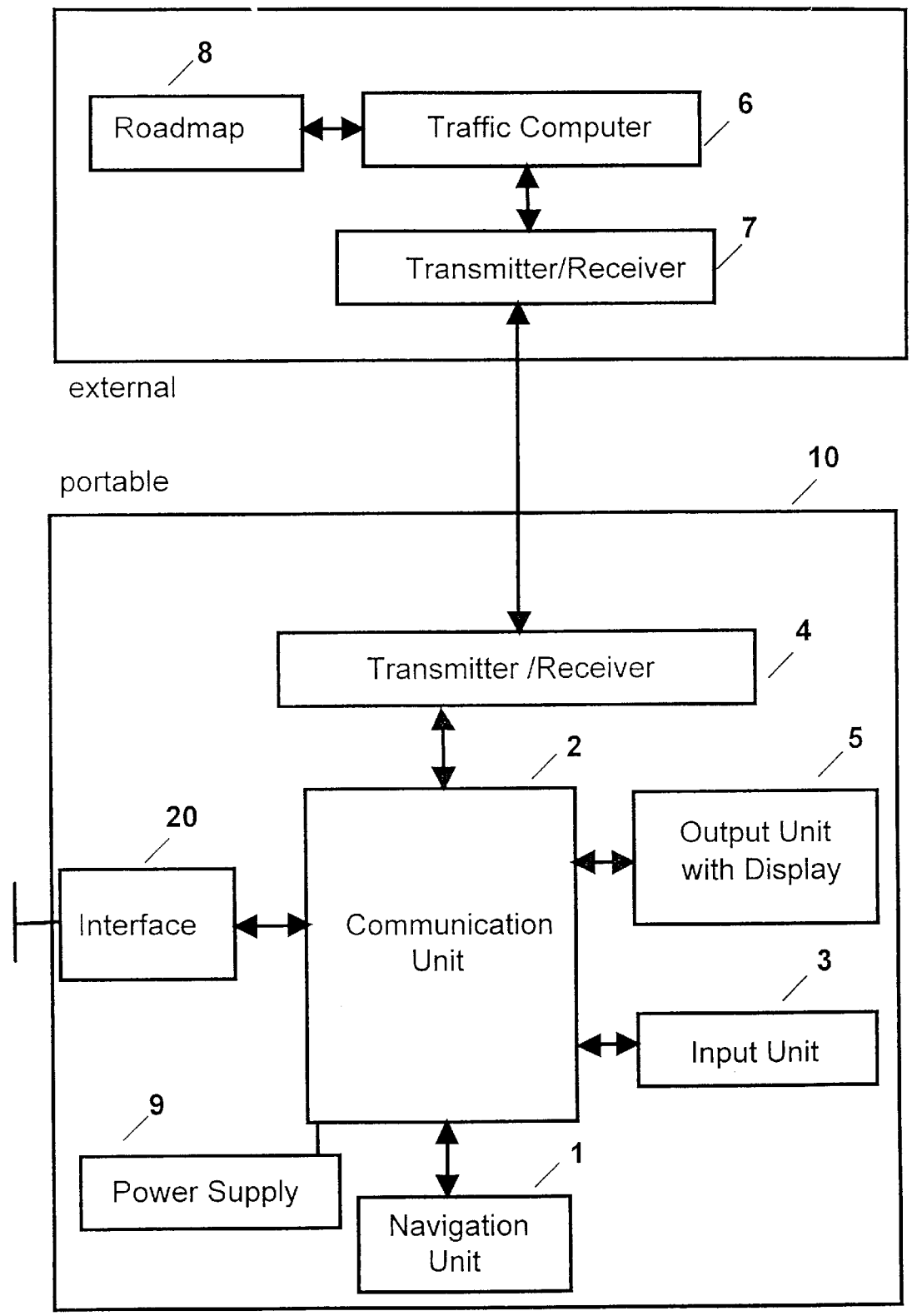
FIG. 1 schematically shows the structure of a portable navigation device with an external computer for route calculation.
Figure 2:
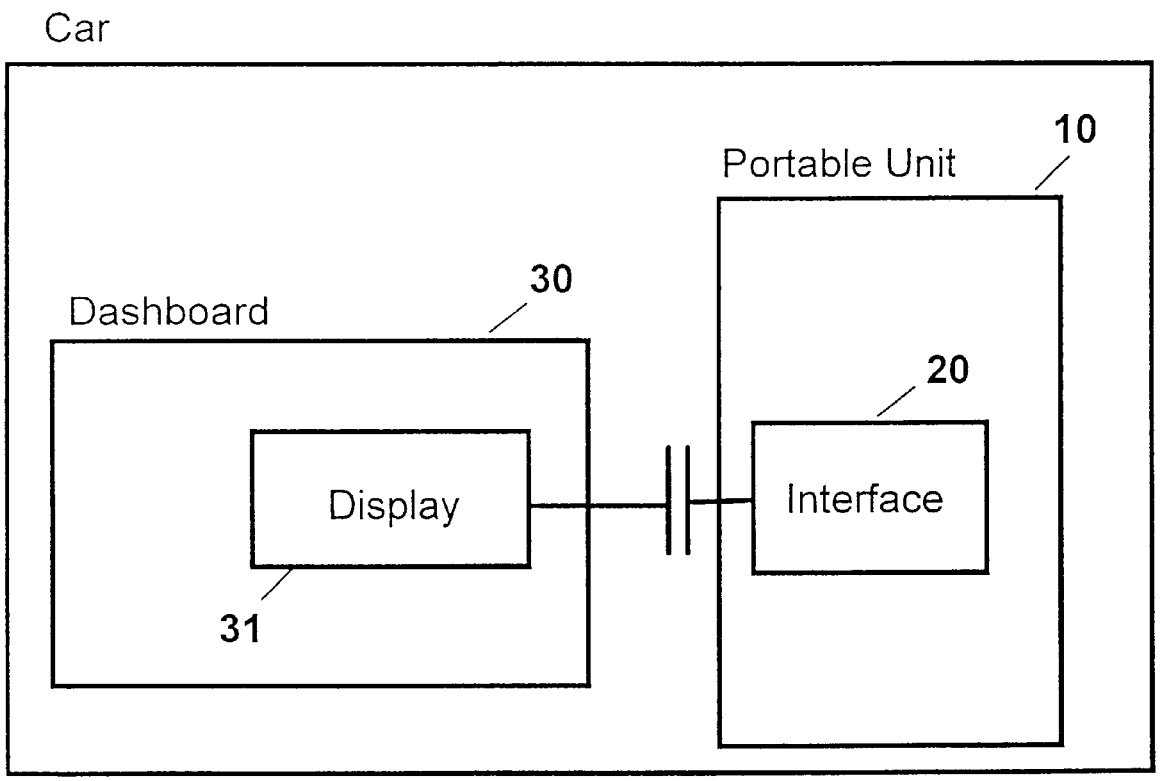
FIG. 2 shows the interface between the navigation device and display in a car.

The portable navigation device 10 has a navigation unit 1, which is designed as a receiver for a satellite navigation system (e.g., the GPS system). Satellite signals to identify the current geographic position are received by a receiver device of the navigation unit 1. To determine the current geographic position, the received satellite signals are sent to a communication unit 2, which is connected for data transmission to the navigation unit 1. To input the target position, in particular, the communication unit 2 is connected to an input unit 3. Input is carried out, for example with a keyboard. To transmit data, the navigation device is equipped with a transmitter/receiver 4, which is also connected to the communication unit 2. To display routing tips, in particular, the communication unit 2 is further equipped with an output unit 5, which has an optical display for directional tips in the form of symbolic arrows and, as applicable, other written information.

Alternately, the navigation unit 1 can be designed as a radio direction-finding system that in itself is known.

The display device of the output unit 5 is designed so that, under the control of a traffic computer 6, it can display the current position with a local map. The navigation device can be switched by the operator to an "output routing tips" mode. In this mode, only routing tips sent by the traffic computer 6 are output on the display. In further development of the invention, the output unit 5 is also embodied as the input unit 3. In this embodiment of the navigation device, the target position is input by marking or handwritten input on the display. A special electronic input pen is provided for this purpose, which in itself is known. Alternately, the output unit 5 can be designed for voice output through a loudspeaker, while the input unit 3 can be designed for voice input through a microphone.

Advantageously, the units 1, 3, 5, 4 connected to the communication unit 2, as well as the exchange of data between the units 1, 3, 5, 4 are controlled by a microcomputer, which is integrated in the communication unit 2. For installation in a motor vehicle, the communication unit 2 is also equipped with a suitable interface 20, via which it can be connected to the electronics system of the vehicle. The communication unit 2 can be connected via this interface to the display 31 and output devices generally arranged in the dashboard 30 of the motor vehicle.

The calculation of the route and the generation of directional tips are carried out in a traffic computer 6, which is located outside of the portable navigation device. The traffic computer 6 can be connected for data transmission to the portable navigation device via a transmitter/receiver 7. For route calculation, the traffic computer 6 has a digitized road map 8, which is stored in a memory of the traffic computer 6. The roads on the road map 8 are characterized by their geographical data. In addition, certain attributes are assigned to individual road segments, providing information on whether the segment in question is closed to traffic at the current time, for example, due to construction activity. The transmitter/receiver unit 4 and the transmitter/receiver 7 are advantageously designed as mobile phones, so that deliberate data exchange can be carried out whenever desired.

The traffic computer 6 is part of a traffic guidance system. This allows the navigation device, particularly when used in an automobile, to take the current traffic situation, including temporary traffic jams, roads closed due to construction, detours, etc., into account in determining the optimal route. In addition, a traffic computer 6 connected to a traffic guidance system permits the output of tips on alternate means of transportation (train and airline schedules).

The portable navigation device for people is equipped with its own power supply 9. As a result, the device can also be used by pedestrians, for example, for navigation purposes. In addition, the device can be connected to the power supply of a motor vehicle; the switchover to an external power supply is undertaken automatically by the microcomputer.

To obtain navigational assistance for a person, the user inputs the destination, the street name, e.g., Marienpiatz, using the keyboard of the input unit 3. Immediately after the target has been input, the communication unit 2 initiates detection of the current geographical position. For this purpose, the receiver of the satellite navigation system 1 is instructed by the communication unit 2 to receive the satellite signals and provide them to the communication unit 2. The communication unit 2 turns over the data to the navigation unit I and sends the target position to the transmitter/receiver unit 4 for transmission to the traffic computer 6. From the transmitter/receiver 7, the received data are turned over to the traffic computer 6, which finds an optimal route on the basis of the road map 8. Starting from the current position, the traffic computer 6 determines the initial path guidance tips for this route. These tips, along with the route, the local map and the marked current position, are transmitted to the communication unit 2. In the "local map" mode of operation, the communication unit turns over the data of the local map, including the marked current position, to the output unit 5, which displays the local map on the display device. In the "output route tips" mode, the coded signals received by the traffic computer 6 are converted by the microcomputer of the communication unit 2 into, for example, symbolic arrows, and after being transferred to the output unit 5 are output in the form of a schematic directional display, in which the directions are shown on the display as arrows. In addition, the directional information is communicated to the operator in voice form via the loudspeaker. By pressing a button, the operator can switch back and forth between the "output route tips" mode and the "local map" mode of operation.

When used in a motor vehicle, the navigation device is connected to and integrated in the electronics system of the vehicle via the interface 20 of the communication unit 2. In this case, the communication unit 2 not only displays the travel tips on its own display, but also uses a display 31 installed in the vehicle.

The device according to the invention can be universally used for route planning, navigation and general orientation (e.g., current location, time to destination) and requires only low expenditure by the user.

8 road map
6 traffic computer
7 transmitter/receiver
external (=extern)
table (=tragbar)
4 transmitter/receiver unit
2 communication unit
5 output unit with display
3 input unit
9 power supply
1 navigation unit

What is claimed is:

1. A personal navigation system for people, comprising:
   a navigation unit including a receiver device for receiving wireless transmitted GPS information to identify a current geographical position of a person;
   a display integrated in a dashboard of a motor vehicle;
   computer means for route planning, said computer means including a memory containing at least one digitized road map; and
   communication means including an input unit for inputting a target position, and an output unit for outputting path guidance information, the output unit comprising a display for displaying the current position with a local map, the communication means further including an interface which is connectable to an electronic system of the motor vehicle, the communication means being operative to output information via the interface to the display integrated in the dashboard of the motor vehicle, the navigation unit and the communication means, including the input unit and the output unit, being configured as a portable hardware unit, a transmitter/receiver unit and a separate power supply being mounted in the portable hardware unit, the computer means being disposed in a stationary manner outside the portable hardware unit, the transmitter/receiver unit being operative to transmit and receive information between the computer means and the communication means by wireless transmission and the communication means being operative to transmit data between the navigation unit and the transmitter/receiver unit.

2. A device as defined in claim 1, wherein the transmitter/receiver unit is a mobile telephone.

3. A device as defined in claim 1, wherein the receiver of the navigation unit is operative to receive correction signals whereby accuracy of the position information is improved.

4. A device as defined in claim 1, wherein the computer means is operative to control a step-by-step output of route tips at the output unit.

5. A device as defined in claim 1, wherein the output unit and the input unit are configured as a single unit, the single unit being configured to have a display by which a target position can be input by one of marking and handwriting.

6. A device as defined in claim 1, wherein at least one of the output unit and the input unit are configured for transmitting voice information.

7. A device as defined in claim 1, wherein the communication means includes a microcomputer.

* * * * *